US010003946B2

(12) United States Patent
Kannan et al.

(10) Patent No.: US 10,003,946 B2
(45) Date of Patent: Jun. 19, 2018

(54) ENHANCED SPATIAL INDEX FOR POINT IN POLYGON OPERATIONS

(71) Applicant: Pitney Bowes Inc., Danbury, CT (US)

(72) Inventors: Anand Kannan, North York (CA); Andrew Kane, Cheshunt (GB)

(73) Assignee: Pitney Bowes Inc., Stamford, CT (US)

( * ) Notice: Subject to any disclaimer, the term of this patent is extended or adjusted under 35 U.S.C. 154(b) by 64 days.

(21) Appl. No.: 15/099,718

(22) Filed: Apr. 15, 2016

(65) Prior Publication Data

US 2017/0303106 A1    Oct. 19, 2017

(51) Int. Cl.

| H04M 11/04 | (2006.01) |
| H04W 4/22 | (2009.01) |
| H04W 4/02 | (2018.01) |
| G06N 5/02 | (2006.01) |
| G06F 17/30 | (2006.01) |

(52) U.S. Cl.
CPC ............... *H04W 4/22* (2013.01); *G06N 5/02* (2013.01); *H04W 4/02* (2013.01); *G06F 17/3087* (2013.01); *G06F 17/30241* (2013.01); *G06F 17/30327* (2013.01); *G06F 17/30333* (2013.01); *G06F 17/30392* (2013.01); *G06F 17/30961* (2013.01)

(58) Field of Classification Search
CPC . H04W 4/22; H04W 4/02; G05N 5/02; G06F 17/30241; G06F 17/30327; G06F 17/30961; G06F 17/30333; G06F 17/30392; G06F 17/3087
See application file for complete search history.

(56) References Cited

U.S. PATENT DOCUMENTS

| 7,580,927 | B1 * | 8/2009 | Abugov | G06F 17/30271 |
| 8,666,989 | B1 | 3/2014 | Gilliam | |
| 8,856,184 | B1 * | 10/2014 | Udeshi | G06F 17/30241 |
| | | | | 707/797 |
| 2001/0011270 | A1 | 8/2001 | Himmelstein | |
| 2003/0130064 | A1 * | 7/2003 | Sasaki | A63B 37/0003 |
| | | | | 473/371 |
| 2017/0091989 | A1 * | 3/2017 | Ramadoss | G06T 1/20 |
| 2017/0103081 | A1 * | 4/2017 | Jones | G06F 17/3087 |

FOREIGN PATENT DOCUMENTS

WO        WO01/33395 A2    5/2001

OTHER PUBLICATIONS

David Smiley, Lucene-5579, Spatial, enhance RPT to differentiate confirmed from non-confirmed hits, then validate with SDV, downloaded and printed Sep. 8, 2016.
David Smiley, Lucene-6362, Differentiate within/approx Spatial Prefix Tree leaf cells, downloaded and printed Sep. 8, 2016.

* cited by examiner

*Primary Examiner* — Barry W Taylor
(74) *Attorney, Agent, or Firm* — Michael J. Cummings; Charles R. Malandra, Jr.

(57) ABSTRACT

An improved method is provided for determining whether a sample point is within a defined geographic area. Indexes for the geographic area of interest are generated in advance. Such indexes complement the traditional spatial indexing techniques such as quad tree and r-tree. The geographic area, as defined by an outer boundary, is subdivided into some regular geometric shape, preferably a rectangle, encoded into a suitable form, and indexed. Then, a simplified comparison of the sample point to the indexed regular shapes is made.

14 Claims, 5 Drawing Sheets

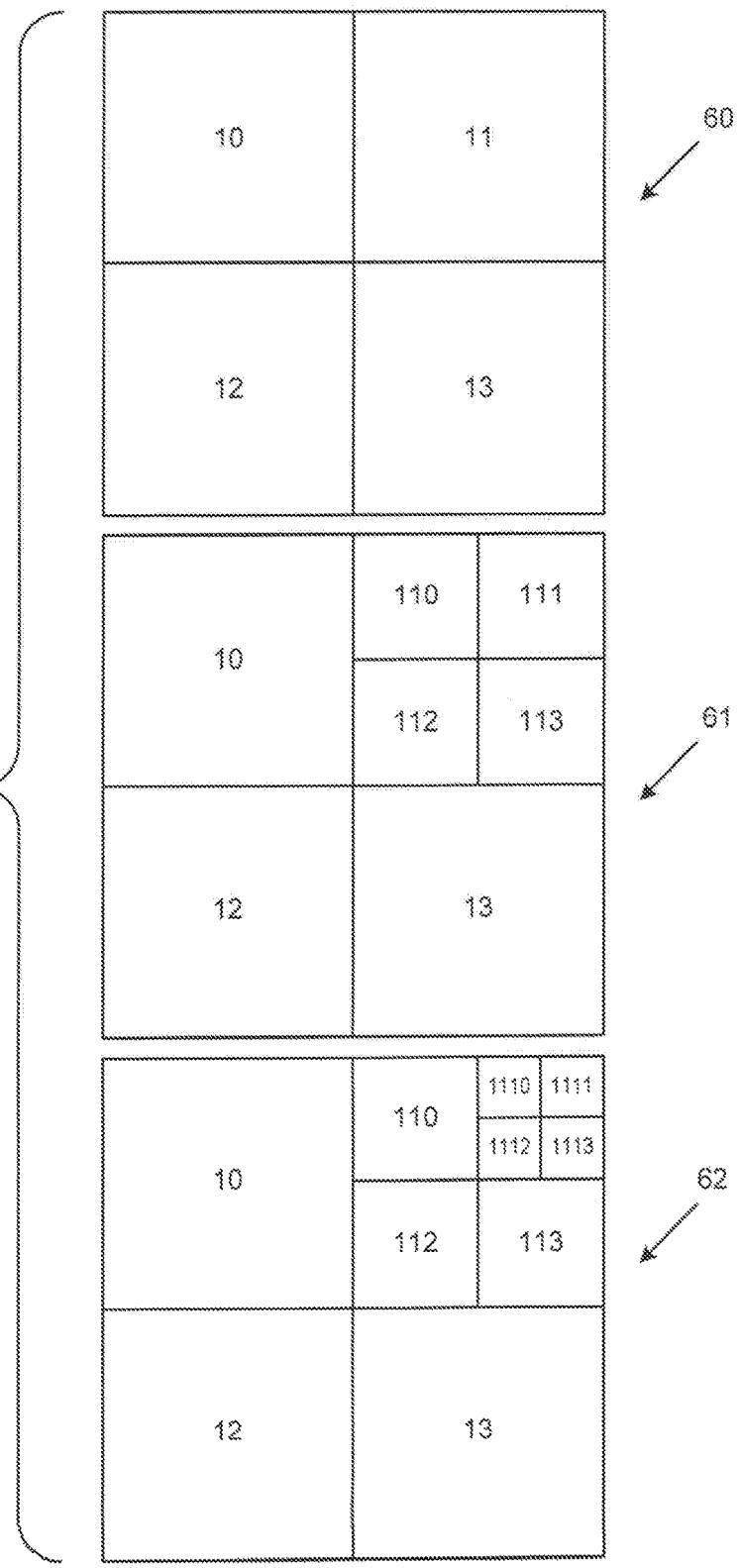

ENHANCED SPATIAL INDEX FOR POINT IN POLYGON OPERATIONS

TECHNICAL FIELD

The present invention relates to a pre-generated geographic index to facilitate analysis of location data.

BACKGROUND OF THE INVENTION

In many location based services applications, it is important to know whether a particular geographic point is inside a particular geographic region. For example, for 9-1-1 emergency services, it is important to assign a context for en event triggered from a mobile device, and to notify the authorities in the appropriate jurisdiction. Depending on which county the mobile device user is in, a different emergency response team may be assigned. This is commonly referred to as "point in poly operations." There are many other similar use cases where dynamically generated points get compared in real time against static (or slowly changing) polygons for geometric interaction. Another common application is geofencing, in which it is determined when a mobile device user enters into a defined region, and using that information to send them targeted messages, or for tracking.

Conventionally, accurate point in poly operations are very processor intensive. Geographic boundaries are often irregular, and accurate results can require a full geometric analysis. Processing power and processing speed can be critical when large numbers of points are being processed, and when timely decisions need to be made based on the output.

SUMMARY OF THE INVENTION

An improved method is provided for determining whether a sample point is within a defined geographic area. This technique improves processing speed for responding to "point in polygon" operation requests for a large majority of locations. In this method, indexes for the geographic area of interest are generated in advance. Such index can complement a regular quad-tree or r-tree index. The geographic area, as defined by an outer boundary, is then subdivided into some regular geometric shape and indexed. Then, a simplified comparison of the sample point to the indexed regular shapes is made.

Creation of Index:

Using the rectangle implementation for this description, a first step for indexing is to define a rectangular boundary box that fully encloses the geographic area. As is conventionally known, this bounding box can be checked against a sample point. But since most geographic areas are irregular in shape, there are many areas inside the bounding box that are not inside the geographic area of interest. Thus, the initial bounding box can only be used to determine with certainty whether the sample point is outside of the geographic area.

In a next step, the boundary box is divided into a plurality of equal first level rectangular boxes at a first dividing level. Each of the first level boxes is then examined to determine whether the first level box is (a) entirely outside the geographic area; (b) entirely inside the geographic area: (c) intersecting with the defined boundary. The result of this determination will determine which boxes can be indexed, and which require further processing.

If the first level box is entirely outside the geographic area, then that box is discarded and it is not part of the indices. This step is to identify and exclude larger areas that fall into that gap between the geographic boundary and the initial bounding box.

If the first level box is entirely inside the geographic area, then that box is added to the indices and is assigned an index number that is stored with the corresponding range of coordinates for that box. This step identifies large blocks that are entirely contained within the geographic areas.

If the first level box intersects with the defined boundary then that box requires further processing, since it includes both desirable area from inside the boundary, and unwanted area that is outside. This further processing includes dividing that box into a plurality of equal second level rectangular boxes at the second dividing level.

The same steps are applied again for the second level boxes that have been created e.g. determining whether they are fully outside, fully inside, or intersecting and the same indexing is performed. In the preferred embodiment, the examination, determination and indexing steps are performed iteratively for a subsequent number of dividing levels. The iterations may continue until (1) there are no more boxes that intersect with the defined boundary, or (2) a maximum dividing level has been reached.

Searching Against an Index:

In a preferred embodiment, the search point, or sample point, to be analyzed can be checked at a high level prior to comparison to the index. That is, prior to the step of comparing the sample point to the index data, it is determined whether the sample point is inside or outside the initial boundary box. Then, if the sample point is outside the boundary box, an output indicates that the sample point is outside of the geographic area. If the sample point is inside the boundary box, then subsequent steps for comparison to the index are followed.

For analysis with the index, the sample point is compared to the coordinate ranges of the indexed boxes to determine if the sample point is included in the indices. If the sample point is within the indexed boxes then a response is provided indicating that the sample point is within the geographic area. If the sample point is not within the indexed boxes then a full geometric analysis is performed of the sample point in comparison to a full geometry of the defined boundary.

In another embodiment, multiple indices are generated for multiple layers of maps having different boundaries for a same physical location. Then, the step of comparing the sample point to the coordinate ranges of the indexed boxes is done concurrently for the multiple indices. An exemplary application of the multiple indices processing is for when the multiple layers represent different types of insurance risks. Then, the method determines whether the sample point is in located in designated risk zones (for example, flood, fire, earthquake) in each of the respective layers.

BRIEF DESCRIPTION OF THE DRAWINGS

FIG. 6 depicts an index numbering scheme that can be applied to index boxes.

DETAILED DESCRIPTION

Traditionally, data structures such as R-trees and quad-trees can be used for speeding up such point in polygon searches. In the classical R-tree implementation, the primary spatial filter is performed using the bounding box of the geometry; and returns either NO (when the bounding box of the searched object does not overlap the bounding box of a record in the table) or MAYBE (when the bounding boxes overlap). In the latter case, this means that we need to actually compare the individual geometries for intersection. A quad tree index has the same characteristics, except that it uses tiles for the exterior approximation, rather than bounding boxes.

Figure 1:
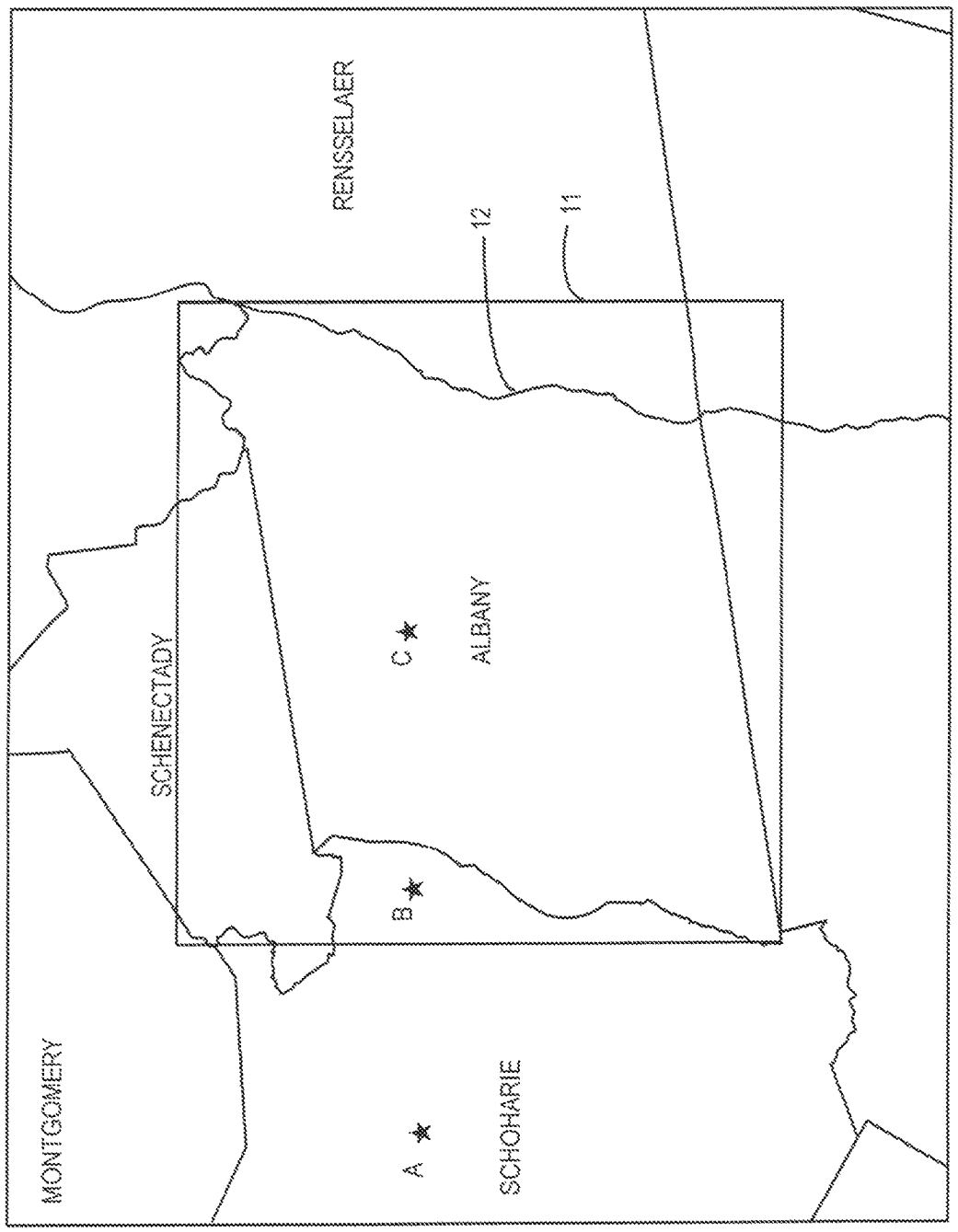
FIG. 1 depicts a single boundary box around a geographic region of interest.

In FIG. 1, an R-tree search can show us the bounding box 11 around the Albany region 12. Point A can be eliminated as a candidate for overlapping the Albany county region 12 quickly. However, an estimation using bounding box 11 cannot distinguish between points B (just outside the border) and C (inside the border).

The current method adds an interior approximation of the polygon to speed up the searches. The method adapted for interior approximation is a novel use of quad tree tiles. The quad tree tiles are used as an inexpensive approximation of the interior of the polygon. This complements and improves the currently used exterior approximation provided by simple shapes, such as bounding boxes (in r-trees) or quad tiles (for quad tree).

For each polygon that we need to index, we store the 'interior' quad tree tiles that are entirely contained in the polygon in addition to the traditional R-tree or quad tree index. Any point within the interior quad tree tiles can be quickly determined to be in without constructing the topology of the polygon. The inscribed rectangles are persisted either using the usual quad tree code (a string formed by the integer encoding using quadrants 0, 1, 2, 3) or using an integer encoding scheme and indexed using traditional B-tree or hash indices.

Figure 2:
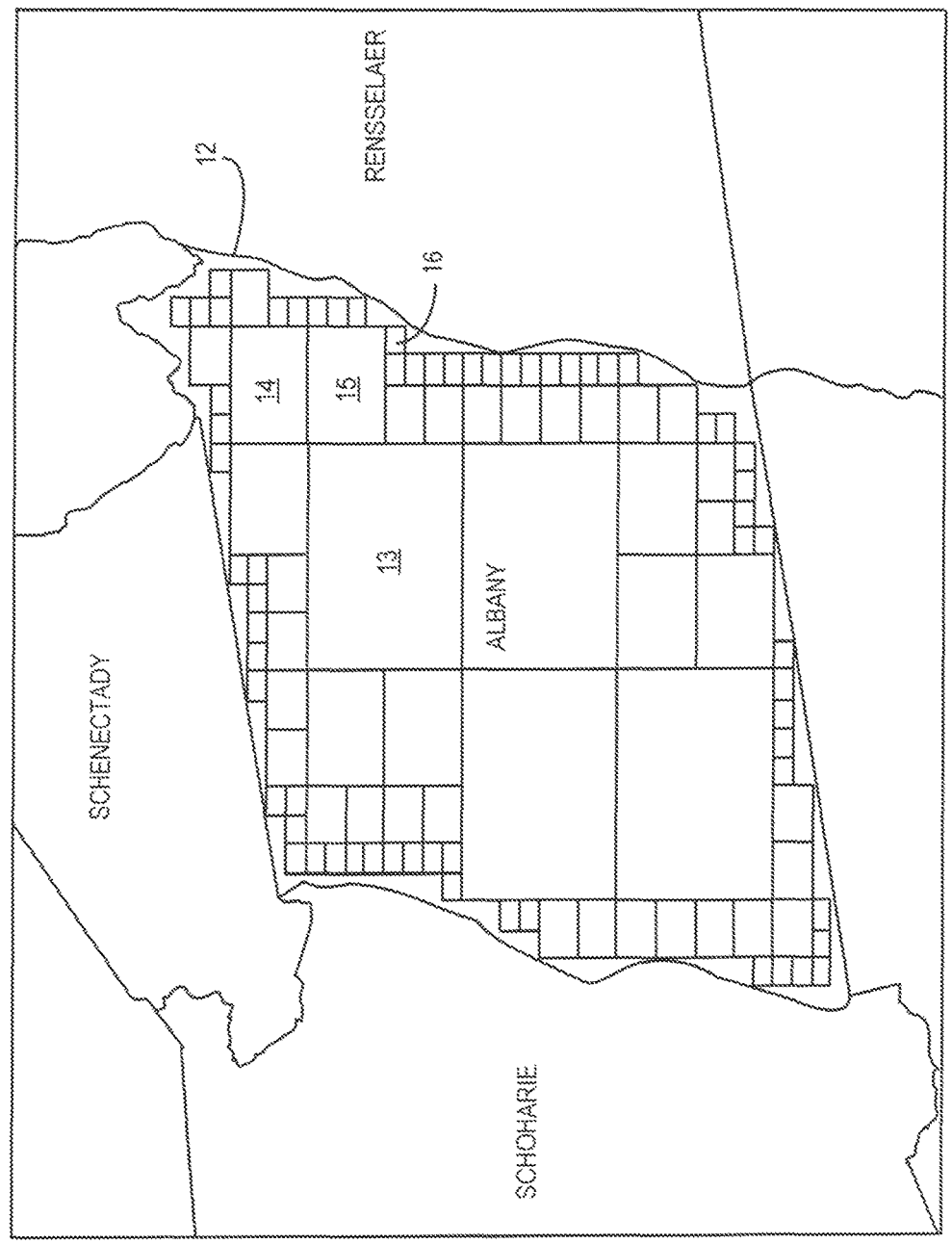
FIG. 2 depicts subdivisions used for indexing.

As seen in FIG. 2, interior quad tree tiles (boxes) of different sizes 13, 14, 15, and 16 have been generated to approximately fill in the interior of the Albany region 12, that is of interest. Each of the boxes 13, 14, 15, and 16 of various sizes is recorded in an index that includes their respective ranges of x,y coordinates.

To determine if a point overlaps a polygon, we see if the point overlaps any of the inscribed rectangles first. If it does, you've answered the question by purely using the indices, without decoding the polygon and constructing the topology. If not, you can fall back on prior techniques, such as ray tracing. Thus it can be seen that this technique avoids using high intensive full geometric analysis for the vast majority of the region, but does not help for the smaller region that is uncovered by the tiles, but is within the search polygon.

Figure 3:
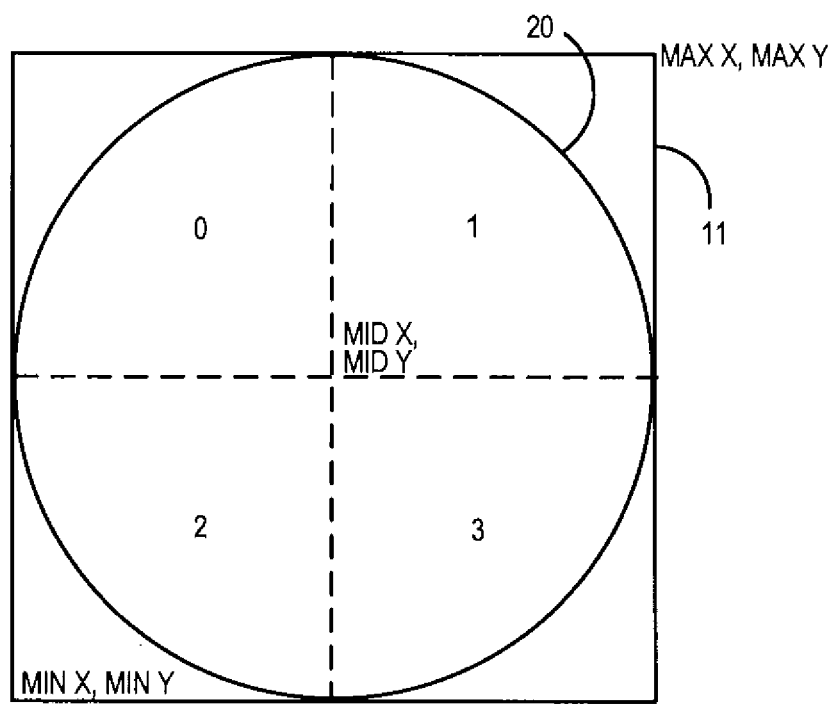
FIG. 3 depicts a simplified example of a first level division of a bouding box around a simplified geographic region.
Figure 4:
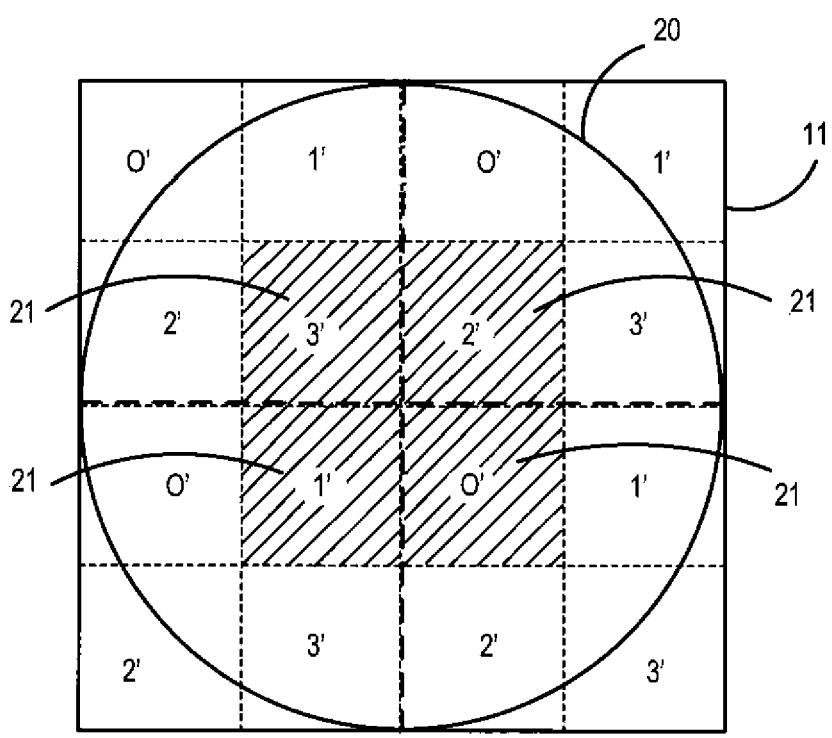
FIG. 4 depicts a simplified example of a second level division of the first level boxes of FIG. 3.
Figure 5:
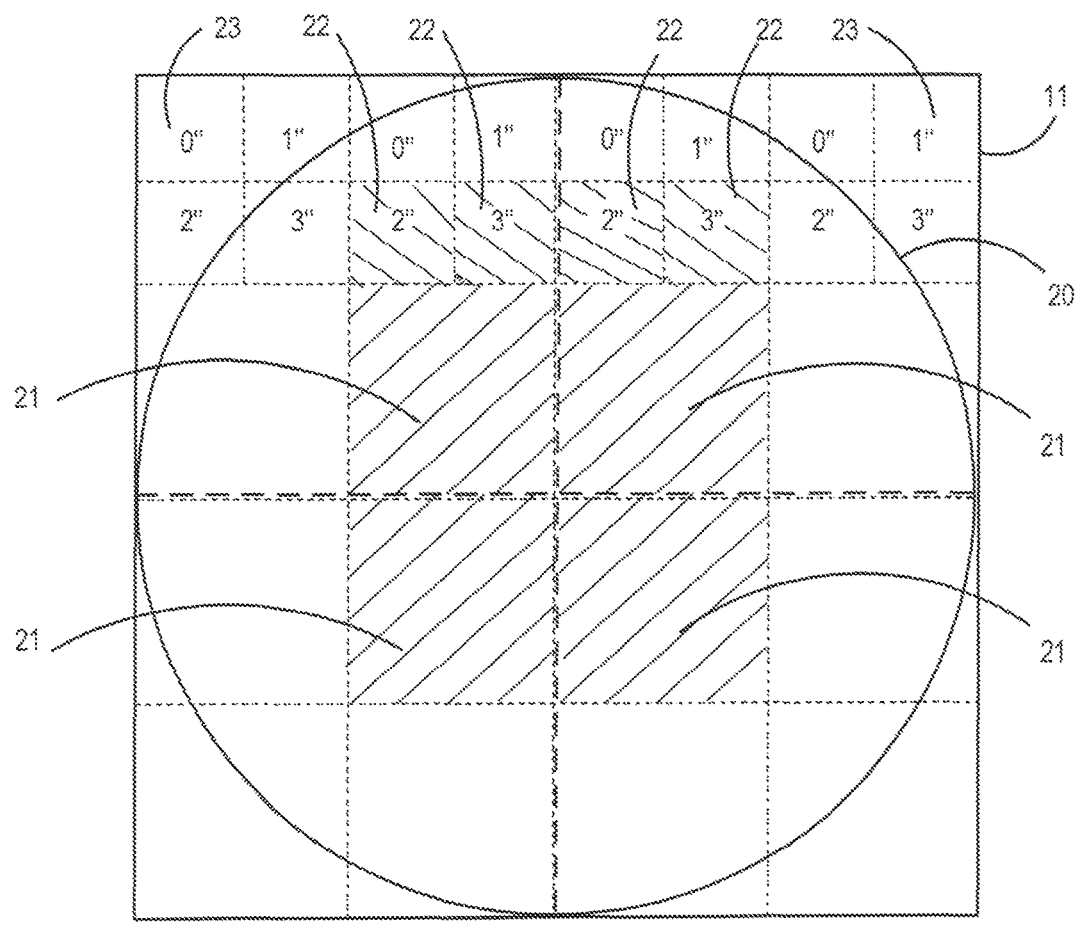
FIG. 5 depicts a simplified example of a third level division of the second level boxes of FIG. 4.

FIGS. 3, 4, and 5 depict an extremely simplified example of steps for forming interior boxes for purposes of indexing in accordance with the improved method herein. In addition to this explanation, representative pseudocode for implementing the preferred embodiment is provided at the end of this specification.

In the example explained with the figures, the geographic region 20 happens to be a circle. A bounding box 11 is positioned to completely enclose the region 20. Preferably, bounding box 11 is the smallest possible rectangle that can contain the geographic region 20. The bounding box 11 can be defined by its MINX, MINY coordinates at the lower left, and the MIDX, MIDY coordinates in the middle of the box 11.

A first step for indexing is to divide the initial box 11 into equal sized smaller boxes. In this example, the box 11 is dived into four equal quadrants, numbered 0, 1, 2, and 3. Those four quadrants are now a "first level" of boxes that are the result of a "first level" division. A further step is to determine whether any of the new first level boxes can be excluded from the index, or indexed. Boxes are excluded from the index when no part of the box is within the geographic region 20. Boxes are added to the index when all of the box is contained within the geographic region 20. Neither of these cases apply in FIG. 3, so it is time for the next step.

In FIG. 4, each of the first level quadrants have been further divided into four equal subdivisions. These new "second level" boxes are labeled within their original boxes as 0', 1', 2', and 3'. At this second level of dividing, we see that four of the second level boxes are completely contained within the geographic region 20. These are the shaded boxes 21, and those boxes are each given a unique indexing number and they are recorded with their corresponding x, y coordinates defining those boxes. The remaining unshaded boxes are still include intersect with the geographic boundary 20, so those boxes are going to be further subdivided.

FIG. 5 shows an exemplary portion of the third level subdivision for the interior box structure that was developed in FIGS. 3 and 4. The third level boxes are labelled 0", 1", 2", and 3". At this third level of dividing we can see that more third level boxes (marked 22) can be added to the index because they are completely within the boundary 20. Also, at this third level, the corner boxes 23 are completely outside the boundary. Boxes 23 can therefore be ignored going forward and they are not made part of the index.

FIG. 6 shows a preferred numbering scheme for identifying boxes generated in a process like that described above. The box set 60 includes only first level boxes, so the numbers only include two digits. As boxes with greater levels of resolution are added, additional digits are added to indicate their level.

In the preferred embodiment, the "0 digit indicates the upper left quadrant box for the level that the digit represents. "1" is the upper right: "2" is the lower left; and "3" is the tower right quadrant.

In box set 61, the upper right box (index number 11) has been subdivided to the second level. Thus a new digit has been added at the end after "11," and that new digit is indicative of which quadrant it is in. The same process has been followed in box set 62 where box 111 has been divided into boxes 1110, 1111, 1112, and 1113.

Note that the use of Quad tree tiles implies that the operations are on a Cartesian plane. However, the core idea is the use of a hierarchical spatial tessellation scheme, whose key can be indexed using traditional scalar indexing techniques. Hence the same idea can be used to index the spherical model of the world (i.e. points and lines expressed in longitude, latitude systems) using an existing tessellation model, such as the hierarchical triangular mesh (HTM), an indexing method proposed by skyserver.org. The only requirements from the index on sphere is that it is hierarchical in nature, and has an inexpensive way to translate a point to a tile an encoded area at the lowest level of tessellation under the hierarchical scheme.

A nice property of this algorithm is that we can a point to search against multiple polygon tables at the same time. For example, if a point representing an insured property needs to be checked against fire risk, flood risk, and earthquake risk boundaries so we can assign an insurance risk score, we could check the point against a tile index that is a union of all tiles from the four individual tables. We will fall back on a table polygon check only in cases where the search does not yield a match for a particular layer.

Although the invention has been described with respect to preferred embodiments thereof, it will be understood by those skilled in the art that the foregoing and various other changes, omissions and deviations in the form and detail thereof may be made without departing from the spirit and scope of this invention.

Pseudocode

The following is an exemplary pseudocode algorithm for implementing the improved indexing method. This is recursive a recursive algorithm that works by dividing the area of interest into four quadrants at each step of the way, as discussed previously. The starting arguments for the recursive procedure are; the polygon to be indexed, an empty string, and the bounding box covering the whole extent of the data. The geometric points referenced in this algorithm are also depicted in FIG. 3.

The above algorithm is invoked with the following starting values:

G=the polygon and multi-polygon that need to be indexed
visitedQuads=an empty string.
MinX, MinY, MaxX, MaxY: the bounding box of the coordinate system To determine if a point overlaps any of the polygons that are being searched, this algorithm is invoked to assign a quad key to the point at MAXLEVEL+1. Then you can search the polygons whose quad keys are prefixes to the point's quad key.

What is claimed is:

1. A computer implemented method for determining whether a sample point is within a geographic area by generating indices for subdivided areas within the geographic area, and the geographic area having a defined boundary, the method comprising:
    defining a rectangular boundary box that encloses the geographic area;
    dividing the boundary box into a plurality of equal first level rectangular boxes at a first dividing level;
    determining for each of the first level boxes whether the first level box is (a) entirely outside the geographic area; (b) entirely inside the geographic area; or (c) intersecting with the defined boundary;
    for each of the first level boxes performing the following indexing steps:
        if the first level box is (a) entirely outside the geographic area, then that box is discarded and it is not part of the indices;
        if the first level box is (b) entirely inside the geographic area, then that box is added to the indices and is assigned an index number that is stored with the corresponding range of coordinates for that box;
        if the first level box is (c) intersecting with the defined boundary then dividing that box into a plurality of equal second level rectangular boxes at the second dividing level;
    repeating the determining and indexing steps for each of the second level boxes as described above for the first level boxes;
    receiving the sample point for which a response is required as to whether the sample point is located within the geographic area;
    comparing the sample point to the coordinate ranges of the indexed boxes to determine if the sample point is included in the indices;
    if the sample point is within the indexed boxes then providing a response indicating that the sample point is within the geographic area; and
    if the sample point is not within the indexed boxes then performing a full geometric analysis of the sample point in comparison to a geometry of the defined boundary.

2. The method of claim 1 wherein the step of repeating further comprises:
    iteratively repeating the determining and indexing steps for a subsequent number of dividing levels until (1) there are no more boxes that intersect with the defined boundary, or (2) a maximum dividing level has been reached.

3. The method of claim 2 wherein the indexing step includes including the level of an indexed box as part of the index number.

4. The method of claim 1 further including, prior to the step of comparing the sample point to the coordinate ranges of the Indexed boxes, determining whether the sample point is inside or outside the boundary box; and
    if the sample point is outside the boundary box, then providing an output indicating that the sample point is outside of the geographic area;
    if the sample point is inside the boundary box, then proceeding with the comparing step and subsequent steps thereafter.

5. The method of claim 1 wherein conventional analysis includes comparing the sample point to a complete geometry of the defined boundary.

6. The method of claim 1 wherein multiple indices are generated for multiple layers of maps having different boundaries for a same physical location, and wherein the step of comparing the sample point to the coordinate ranges of the Indexed boxes is done concurrently for the multiple Indices.

7. The method of claim 6 wherein the multiple layers represent different types of insurance risks, and whereby the method determines whether the sample point is in located in designated risk zones in each of the respective layers.

8. A computer implemented method for determining whether a sample point is within a geographic area by generating indices for subdivided areas within the geographic area, and the geographic area having a defined boundary, the method comprising:
    defining a geometric boundary shape that encloses the geographic area;
    dividing the boundary shape into a plurality of equal first level shapes at a first dividing level;
    determining for each of the first level shapes whether the first level shape is (a) entirely outside the geographic area; (b) entirely inside the geographic area; or (c) intersecting with the defined boundary;
    for each of the first level shapes performing the following indexing steps:
        if the first level shape is (a) entirely outside the geographic area, then that shape is discarded and it is not part of the indices;
        if the first level shape is (b) entirely inside the geographic area, then that shape is added to the indices and is assigned an index number that is stored with the corresponding range of coordinates for that shape;

if the first level shape is (c) intersecting with the defined boundary then dividing that shape into a plurality of equal second level shapes at the second dividing level;

repeating the determining and indexing steps for each of the second level shapes as described above for the first level shapes;

receiving the sample point for which a response is required as to whether the sample point is located within the geographic area;

comparing the sample point to the coordinate ranges of the indexed shapes to determine if the sample point is included in the indices;

if the sample point is within the indexed shapes then providing a response indicating that the sample point Is within the geographic area; and if the sample point is not within the indexed shapes then performing a full geometric analysis of the sample point in comparison to a geometry of the defined boundary.

9. The method of claim 8 wherein the step of repeating further comprises:

iteratively repeating the determining and indexing steps for a subsequent number of dividing levels until (1) there are no more shapes that Intersect with the defined boundary, or (2) a maximum dividing level has been reached.

10. The method of claim 9 wherein the indexing step includes including the level of an indexed shape as part of the index number.

11. The method of claim 8 further including, prior to the step of comparing the sample point to the coordinate ranges of the indexed shapes, determining whether the sample point is inside or outside the boundary shape; and if the sample point is outside the boundary shape; then providing an output indicating that the sample point is outside of the geographic area;

if the sample point is inside the boundary shape, then proceeding with the comparing step and subsequent steps thereafter.

12. The method of claim 8 wherein conventional analysis includes comparing the sample point to a complete geometry of the defined boundary.

13. The method of claim 8 wherein multiple Indices are generated for multiple layers of maps having different boundaries for a same physical location, and wherein the step of comparing the sample point to the coordinate ranges of the indexed shapes is done concurrently for the multiple indices.

14. The method of claim 13 wherein the multiple layers represent different types of insurance risks, and whereby the method determines whether the sample point is in located in designated risk zones in each of the respective layers.

* * * * *